United States Patent [19]

Siebrecht

[11] 4,076,444
[45] Feb. 28, 1978

[54] DRILL BIT EXTENSION

[76] Inventor: Gary L. Siebrecht, 1647 S. Mulford Road, Rockford, Ill. 61108

[21] Appl. No.: 456,021

[22] Filed: Mar. 29, 1974

[51] Int. Cl.² ............................................. B23B 31/44
[52] U.S. Cl. ............................... 408/226; 408/239 A
[58] Field of Search ............ 408/226, 239; 81/177 A, 81/180 R, DIG. 11; 403/306, 307, 299, 343

[56] References Cited

U.S. PATENT DOCUMENTS

| | | | |
|---|---|---|---|
| 1,225,209 | 5/1917 | Beaulieu | 408/239 |
| 2,110,202 | 3/1938 | Crane | 81/177 A |
| 2,752,965 | 7/1956 | Mackey | 408/226 X |
| 3,073,633 | 1/1963 | Jeffs | 287/54 |
| 3,797,865 | 3/1974 | Ballentine | 403/343 UX |

Primary Examiner—Leon Gilden
Attorney, Agent, or Firm—Morsbach & Pillote

[57] ABSTRACT

The drill bit extension which utilized a length of conventional pipe or thin wall conduit without modification. A chuck adapter fitting and a drill bit adapter fitting are located at opposite ends of the pipe. Both have a pilot portion adapted to extend into the pipe, and a threaded tapered portion which engages the pipe interior. The chuck adapter fitting has a reduced shank to be received in a conventional drill chuck; and the drill adapter fitting has an opening with means for locking a drill bit into the fitting. Since the fittings are used with an unmodified pipe, the pipe section can be used in drilling the holes and then left in place after the fittings are removed. In this manner, water lines and electrical conduit may be installed simultaneously with drilling the required holes therefore.

13 Claims, 6 Drawing Figures

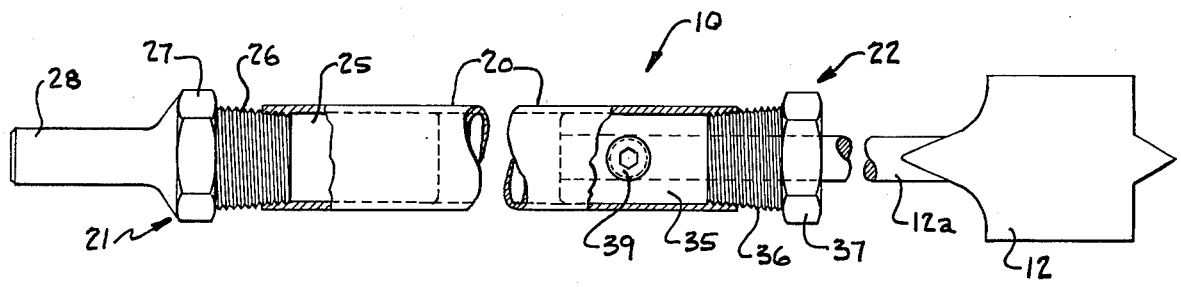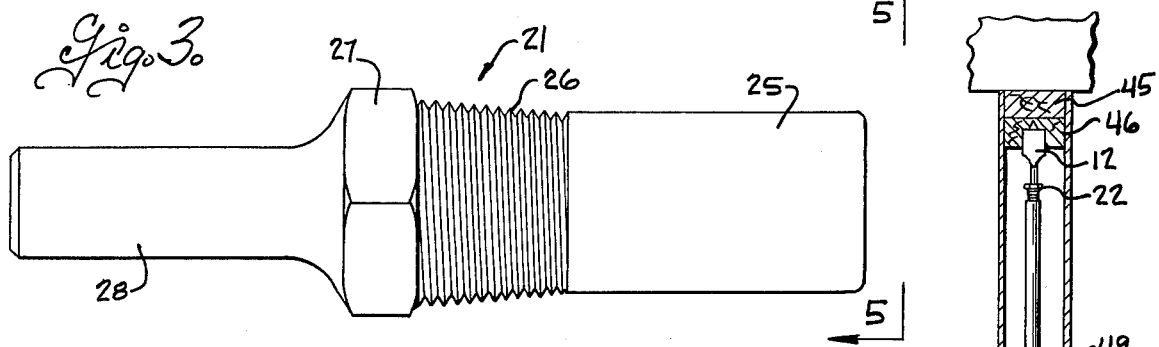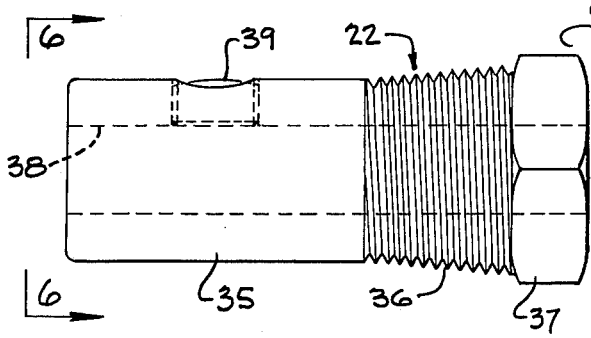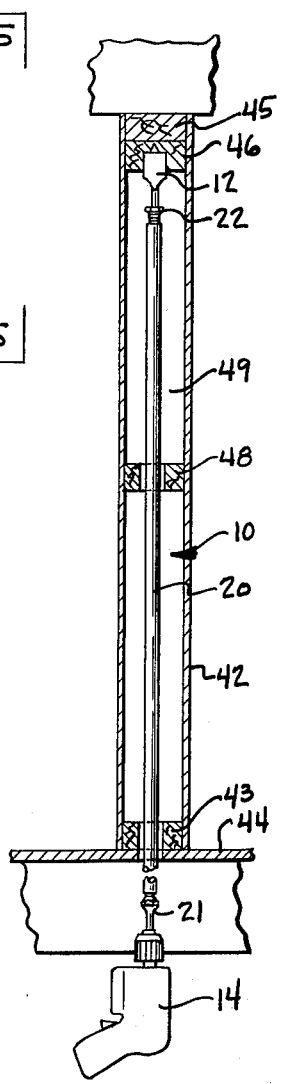

DRILL BIT EXTENSION

BACKGROUND

The invention pertains generally to tools and especially to cutting by use of a rotating, axially moving tool.

In building construction, water lines and electrical conduits are placed in the hollow walls. This is a desirable location even during renovation; however, aligning openings in spaced wall members is both frustrating and time consuming. Indeed, if a "fire stop" is provided between studs, one is faced with the further problem of somehow drilling a hole therethrough and then pushing the conduit or pipe through three holes which are never easily aligned. It is desirable to provide a tool which assures that holes spaced several feet apart, are aligned when drilled. It is even preferable to be able to install the pipe or conduit simultaneously with drilling the required holes therefore or if necessary to drill horizontally through several studs.

SUMMARY

The present invention relates to the art of cutting by use of a rotating, axially moving tool and, more particularly to a unique drill bit extension for use in combination with a drill and drill bit.

It is a general object of the present invention to provide a tool for drilling holes spaced several feet apart and assuring that they are aligned.

Another object of the present invention is to provide a tool by which pipe or conduit is installed simultaneously with drilling the holes therefore.

Still another object is to provide a drill bit extension which utilizes unmodified pipe for a major portion of its extension.

Yet another object is to provide a drill bit extension in accordance with the foregoing objects in which the pipe is not damaged in drilling so that it may be left in situ for use in its ordinary manner as a water line or electrical conduit, for example.

It is another object of the present invention to provide a drill bit extension having a chuck adapter fitting and a drill bit adapter fitting at opposite ends of the length of tube.

These, and other objects and advantages of the present invention, will become apparent as the same becomes better understood from the following detailed description when taken in conjunction with the accompanying drawings.

DRAWING

FIG. 1 is a cross-section through a building wall and showing an embodiment of the present invention in use to drill aligned holes;

FIG. 2 is a full-scale elevational view of a drill bit extension constructed in accordance with the present invention, and having portions in section for better illustration of the parts;

FIG. 3 is an elevational view of the chuck adapter fitting on an enlarged scale;

FIG. 4 is an elevational view of the drill bit adapter fitting also on an enlarged scale;

FIG. 5 is an end view of the chuck adapter fitting as seen from line 5—5 of FIG. 3; and FIG. 6 is an end view of the drill bit adapter fitting as seen from line 6—6 of FIG. 4.

DESCRIPTION

Reference is now made more particularly to the drawings which illustrate the best presently known mode of carrying out the invention and wherein similar reference characters indicate the same parts throughout the several views.

The drill bit extension, designated generally by the numeral 10, is adapted for use with a drill bit 12 and a drill 14 which may be either manually or power driven. The drill bit extension 10 is adapted to utilize a length of conventional pipe 20 which may be rigid or thin wall conduit, water pipe, gas pipe or the like. The pipe 20 has inner and outer diameters with a generally smooth interior surface. The exterior surface may be smooth as in the case of thin wall conduit, or threaded in the case of rigid conduit, water pipe and gas pipe. A drill chuck adapter fitting 21 is located at one end of the pipe 20, and a drill bit adapter fitting 22 is at the other end.

The drill chuck adapter fitting 21 is shown in FIGS. 3 and 5 and includes a body having a cylindrical pilot portion 25, a threaded tapered portion 26, a drive head 27, and an elongate shank 28. The pilot portion 25 is dimensioned to be guidably received inside the pipe 20 and has a diameter slightly less than the inside diameter of the pipe. The threaded tapered portion 26 is of a frusto-conical shape having threads throughout its exterior surface. The minor outer diameter of the threaded portion 26 is less than the inside diameter of the pipe 20 and substantially the same as the outer diameter of the pilot portion and the major outer diameter is greater than the inside diameter of the pipe. The taper is made low, for example of the order of 0.15 inches per inch, to minimize the tendency of the threaded taper portion to tilt or cock in the pipe and the pilot portion extends from the minor end of the threaded taper portion a substantial distance preferably greater than its diameter to guide the fitting axially in the pipe. In this manner, the threaded portion 26 is adapted to be turned into the end of the pipe until it securely engages and binds against the inner surface thereof. The drive head 27 is preferably of polygonal cross-section to receive a wrench to turn the threaded portion into the pipe. The shank portion 28 is dimensioned to be received in a chuck of drill 14 in the usual manner and may have one or more flats (not shown) to inhibit turning of the shank in the drill chuck.

The drill bit adapter fitting 22 is best shown in FIGS. 4 and 6 and similarly includes a cylindrical pilot portion 35 dimensioned to be guidably received in the pipe 20 and a threaded tapered portion 36 adapted to engage the inside of the pipe, and a drive head 37, also preferably of polygonal configuration to receive a wrench. The pilot portion 35 and the threaded tapered portion 36 of the drill bit adapter fitting are preferably made the same as the corresponding pilot portion 25 and threaded tapered portion 26 of the chuck adapter fitting. The drill bit adapter fitting is arranged to form a chuck for the drill bit and, in the preferred embodiment illustrated, the drill bit adapter fitting 22 has a bore 38 extending therethrough to receive the shank 12a of drill 12 in the manner illustrated in FIG. 2. A locking means such as set screw 39 is provided in a transverse bore to lock the shank of the drill bit into position and, preferably, the locking means is mounted in the pilot portion 25.

Different size drill and chuck adapter fittings must be provided for pipes of different internal pipe size. For example, ½ inch E.M.T. conduit and ½ inch water pipe have an internal pipe size or diameter in a range of about 0.615 to 0.625 inches. It has been found that a threaded tapered portion having a minor outer diameter of 0.600 inches and, a major outer diameter of 0.675 inches and a length of about 0.500 inches will accommodate pipes having internal diameters in the above range and bind against the internal walls of the pipes when the fittings are turned into the pipes. The outer diameter of the pilot portions of the fittings is made substantially equal to the minor outer diameter of the threaded tapered portion which, in the above example, was 0.600 inches, and the length of the pilot portion is made greater than the diameter, for example about 1 inch. The threads are right hand threads so as to tend to tighten the fittings when the drill drives the drill bit extension in the usual clockwise direction and 18 to 24 threads per inch is preferred. The adapter fittings are hardened as by heat treating so that the threads on the threaded tapered portions are harder than the pipes to be engaged thereby so that the threads on the fittings form a partial or quasi thread in the pipe when the fittings are turned into the pipe. The threads on the adapter fittings are preferably all sharp crested and, as shown in FIGS. 3 and 4, the root diameter of the threads at the inner ends of the tapered portions is less than the outer diameter of the pilot portion. Shank 28 on the chuck adapter fitting is conveniently of ¼ inch size and the drill bit socket in the drill bit adapter fitting is conveniently slightly over ¼ inch to receive ¼ inch drill shanks.

In use, the adapter 21 and 22 are threadedly engaged with the internal surface at opposite ends of the pipe 20, the drill bit 12 secured into the drill bit adapter 22, and the shank 28 of the drill chuck adapter 21 secured in the chuck of the drill 14. Once the tapered threads start to engage the inner walls of the pipe, they advance the fitting in screw fashion into the end of the pipes and, since the threaded portion is tapered, the threads bind and become self-locking in the pipe to inhibit further relative turning between the fitting and the pipe. Referring to FIG. 1, there is illustrated a wall 42 of conventional construction which usually includes a base plate 43 secured to the flooring 44 and having a double plate 45, 46 on which ceiling rafters bear. Conventionally, a fire stop 48 extends between vertical studs 49 about midway up the wall. The present invention is adapted for drilling holes through spaced workpieces such as the base plate 43, fire stop 48 and caps 45 and 46; with assurance that the holes will be aligned once the drilling is completed. The pipe 20 is not at all damaged by the adapters 21 and 22 and may be left in place. In this manner, electrical conduit or water pipe, for example, can be installed simultaneously with the drilling operation, and the problem of inserting the pipe through predrilled holes is eliminated.

It is now deemed apparent that the adapters 21 and 22, in combination with a conventional piece of pipe 20, provide an extension bit of any suitable length controlled only by the length of the pipe, and without requiring any modification of the pipe. The section of pipe can, for example, be the same pipe which is to be installed in the wall 42 or the like. The adapter 21 and 22 are mounted on the pipe by turning the tapered thread sections 26 or 36 into the respective ends of the pipe 20, and the extension bit is then used to drill the holes in the wall. Thereafter, the adapter fittings 21 and 22 can be removed from the pipe section and the pipe left in the wall for use as conduit or water pipe, whichever the case may be. In those installations where the pipe section is to be left in the wall, the pipe section is precut to the desired length for the wall installation and, in the case of water pipe and the like, the ends of the pipe section are externally threaded for reception of fittings after installation. As will be appreciated, the length of pipe can include multiple pipe sections coupled together by conventional pipe or conduit couplings.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. A drill bit extension for use with a drill bit comprising, a length of pipe having an unthreaded internal wall of preselected internal pipe size, a drill bit adapter fitting removably mounted in one end of the length of pipe and a chuck adapter fitting removably mounted in the other end of the length of pipe, said adapter fittings each including an externally threaded taper portion tapering from a minor outer diameter no larger than the internal pipe size to a major outer diameter sufficiently larger than the internal pipe size to form a binding fit with the pipe when turning threinto, said adapter fittings each including a pilot portion extending from the minor outer diameter end of the threaded taper portion and having an outer diameter substantially equal to said minor outer diameter and slidable in the pipe to maintain the axis of the respective fitting in alignment with the pipe axis when turning the threaded taper portion into the pipe, the drill bit adapter fitting having chuck means coaxial therewith for receiving the shank of the drill bit, and said chuck adapter fitting having shank means extending axially from the major end of its threaded taper portion for reception in a drill chuck.

2. A drill bit extension according to claim 1 wherein said chuck means comprises a coaxial passage in the drill bit adapter fitting opening at the end remote from the pilot portion for receiving the shank of a drill bit, and locking means on the drill bit adapter fitting intersecting said passage for engaging the shank of the drill bit.

3. A drill bit extension according to claim 2 wherein said locking means is mounted on the pilot portion of said drill bit adapter fitting.

4. A drill bit extension according to claim 1 wherein said taper on said externally threaded taper portion is about 0.15 inches per inch.

5. A drill bit extension according to claim 1 wherein each of said adapter fittings have a multi-sided head portion at the major diameter end of the threaded taper portion for receiving a tool for turning the respective adapter fitting into and out of the length of pipe.

6. A drill bit extension according to claim 5 wherein the threads on said threaded taper portion of said adapter fittings are in a range of 18 to 24 threads per inch.

7. A drill bit extension kit for use with a length of pipe having an unthreaded internal wall of preselected internal pipe size to form a drill bit extension comprising, a drill bit adapter fitting adapted to be removably mounted on one end of the length of pipe and a chuck adapter fitting adapter to be mounted on the other end of the length of pipe, said adapter fittings each including an externally threaded taper portion, tapering from a minor outer diameter at one end to a major outer diameter at the other end, said adapter fittings each including a pilot portion extending from said one end of the respective threaded taper portion and having an outer diameter substantially equal to said minor outer diameter of the taper threaded portion, said adapter fittings each having a non-circular head at said other end of said threaded taper portion for receiving a tool for turning the respective adapter fitting into a length of pipe, said drill bit adapter fitting having an axial socket at the end remote from its pilot portion for receiving a drill bit shank, and said chuck adapter fitting having a shank extending axially from the end remote from its pilot portion for reception in a drill chuck.

8. A drill bit extension bit according to claim 7 wherein said thread taper portion has a taper of about 0.15 inches per inch.

9. A drill bit extension bit according to claim 7 wherein said socket extends into the pilot portion of said drill bit adapter fitting and means on said pilot portion of the drill bit adapter fitting intersects said socket for locking a drill bit shank in the fitting.

10. A drill bit extension according to claim 1 wherein said pilot portion has a length greater than its diameter.

11. A drill bit extension according to claim 1 wherein the threads at the minor outer diameter end of the externally threaded taper portion have a root diameter less than the outer diameter of the pilot portion.

12. A drill bit extension kit according to claim 7 wherein said pilot portion has a length greater than its diameter.

13. A drill bit extension kit according to claim 7 wherein the threads at the minor outer diameter end of the externally threaded taper portion have a root diameter less than the outer diameter of the pilot portion.

* * * * *